May 19, 1953  D. K. BRAGG ET AL  2,639,189
VAPOR PRESSURE THERMOMETER
Filed March 14, 1951
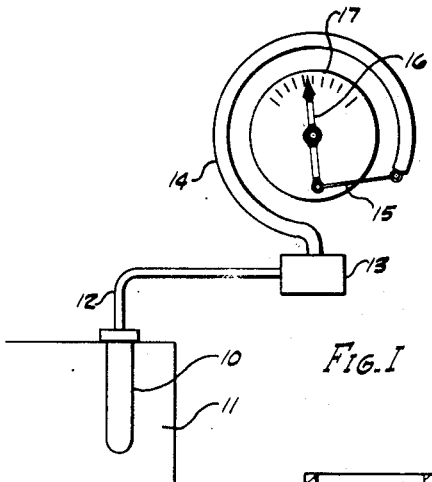
FIG. I
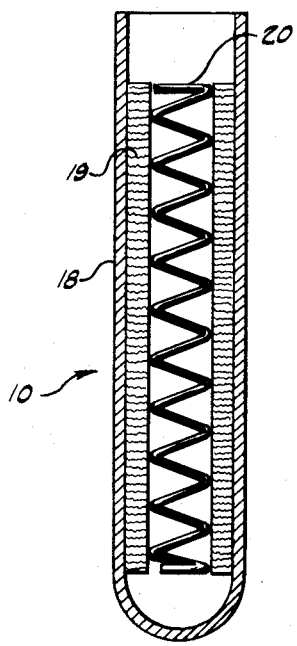
FIG. II
INVENTOR.
DAVID K. BRAGG
WILLIS F. HICKES
BY HERBERT A. NEUMAN
Curtis, Morris & Safford
ATTORNEYS Patented May 19, 1953

2,639,189

UNITED STATES PATENT OFFICE 2,639,189

VAPOR PRESSURE THERMOMETER

David K. Bragg, Foxboro, Willis F. Hickes, Sharon, and Herbert A. Neuman, Wrentham, Mass., assignors to The Foxboro Company, Foxboro, Mass., a corporation of Massachusetts Application March 14, 1951, Serial No. 215,428

2 Claims. (Cl. 297—5)

This invention relates to thermometers, with particular reference to thermometers used with instruments for controlling, recording, or indicating, in relation to changes in a variable condition as represented by temperature changes.

The concern of this invention is with temperature responsive bulbs for such thermometers, and with the type of bulb which uses a volatile liquid, with changes from liquid to vapor phase with temperature rise, and the reverse. The vapor pressure is used to produce an effect which may be used for controlling, indicating or recording functions, as desired.

It is an object of this invention to provide a new and improved device of this nature.

Referring to the drawings:

Figure I illustrates a simple application of a thermometer bulb; and

Figure II is a section of a bulb in illustrative embodiment of this invention.

It has been found to be desirable, in certain instances, to use a mixture of volatile liquids in a thermometer bulb. Various combinations of vapor pressure-temperature relations may be achieved as desired, by mixing such liquids in varying percentage relations both with respect to each other and with respect to the volume of the thermometer bulb and the volume of a closed system including the bulb. Dodecane and propane are examples of liquids which may be used for this purpose.

An illustration of the use of such mixed liquids is disclosed in the U. S. patent application of Clarke Minter, filed September 2, 1949, as a Thermometric System, Serial No. 113,848. This invention is concerned with the use of liquids and their vapors as disclosed in the Minter application. The liquids are miscible and the relative and absolute quantities are such that the vapor pressure in the system is a substantially linear function of the temperature to which the system is responsive, with reference to Raoult's law as applied in the Minter application.

The action, upon a temperature rise, in a thermometer bulb having two volatile liquids with different boiling points, mixed therein, is that the liquids are driven from the mixture into their vapor states.

The problem with which this invention is particularly concerned is made evident under temperature dropping conditions. A temperature drop reverts the vapors to liquid phase. As this action is progressing we have the condition of a temperature bulb, usually a small diameter tubular body, containing the combination of a liquid mixture and vapors of said liquids trying to revert to liquid phase and mix with the liquid already in mixture.

Since the liquid mixture within the small diameter tube presents only the top of a liquid column as a comparatively small exposed surface area, an undesirable length of time is necessary for the remaining vapors to revert to liquid phase and diffuse to homogeneity throughout the depth of the liquid mixture.

That is, after a temperature rise, there is an undesirable time lag in vapor pressure drop as related to temperature drop.

This undesirable time factor is eliminated by the present invention.

Referring to Figure I, a vapor pressure thermometer bulb 10 is shown in a process chamber 11. Extending from the thermometer 10 is a vapor pressure conduit 12, leading to an input housing 13 of a Bourdon tube 14. The Bourdon has an end fixed in the housing 13, and is curved generally in the form of a circle, terminating in a free end, short of a full circle. A connector 15 joins the free end of the Bourdon with a pivoted indicator 16 at a point removed from the pivot. A scale 17 is provided for cooperation with the indicator 16.

Thus a temperature change in the process chamber 11 causes a change in the vapor pressure within the Bourdon 14 and this, in the customary and well-known fashion, causes movement in the free end of the Bourdon and a consequent change of position of the indicator 16 about its pivot and in relation to the scale 17.

Figure II shows the detail of the thermometer bulb 10 of Figure I. It comprises an outside, tubular housing 18 with one end closed, and formed of any of the usual metals suitable for heat transfer. Within the bulb tube 18 there is a porous tubular wick sleeve 19, fitting against the inner wall of the bulb tube, and extending a substantial distance along the inside of the bulb tube 18. The wall thickness of the wick 19 is small as compared to the remaining open radial dimension in the thermometer bulb within the wick tube.

The wick wall thickness is also, and more importantly, small as compared to the wick surface area open to the central space remaining in the thermometer bulb.

The wick may be formed of cotton, or of porous sintered materials, glass fabric, woven metal fabric, or flock coating. The general requirements are that the wick be porous, able to withstand the temperatures involved, and not subject to harm from chemical action of the liquids used in the bulb, or their vapors. Because of its porous nature, and small thickness dimension, such a wick sleeve has low mass and will not store up heat which might slow up the response of the system to temperature variation.

The wick 19 is held in intimate contact with the inside wall of the bulb housing 18 by a helical spring 20, inserted within the wick sleeve 19, and allowed to expand radially against the wick sleeve.

A porous sleeve is thus provided which may be arranged to absorb all of the liquid in the thermal system and which offers a large liquid surface or interface between liquid and vapor with paths of negligible distances from the interface to any part of the liquid.

With this structure and arrangement, as a temperature drop occurs, the wick 19 rapidly absorbs the vapor condensates of the liquids being used and this liquid, being spread all through the wick, presents a large exposed surface area to the vapor remaining in the bulb. This means that the time of reversion from vapor to liquid and the achievement of homogeneity in the liquid, is greatly reduced, and that this reversion may be accomplished without an undersirable time lag.

We claim:

1. A vapor thermometer bulb in the form of a tube with one end closed, said tube containing a mixture of two liquids having different boiling points, vapors of said liquids, a wick in the form of a tubular sleeve engaging the walls of said bulb, and a coil spring within said wick as a means of holding said wick against the inner walls of said bulb, said wick being dimensioned so as to present a large, exposed, surface area in relation to its thickness whereby said mixture, when contained by said wick, presents a large, liquid, exposed surface area for rapid absorption and diffusion to homogeneity of the vapor condensates of said liquids under temperature dropping conditions.

2. In a vapor pressure thermometric closed system including a thermometer bulb, a mixture of mutually miscible liquids, one of which is relatively more volatile than the other and which exhibits a vapor pressure which varies nonlinearly with temperature within the range of the temperature being measured, the relative and absolute quantities of said liquids being such that the vapor pressure in said system is a substantially linear function of the temperature to which said system is responsive, a wick in the form of a tubular sleeve engaging the walls of said bulb for receiving said liquids, and a coil spring within said wick as a means of holding said wick against the inner walls of said bulb, said wick having a large exposed surface area in relation to its thickness, whereby the liquid form of said mixture is contained by said wick and presents an extensive and shallow liquid distribution for rapid absorption and diffusion to homogeneity of the vapor condensates of said liquids under temperature dropping conditions.

DAVID K. BRAGG.
WILLIS F. HICKES.
HERBERT A. NEUMAN.

References Cited in the file of this patent

UNITED STATES PATENTS

| Number | Name | Date |
|---|---|---|
| 792,588 | Fulton | June 20, 1905 |
| 1,915,265 | Bichowsky | June 20, 1933 |

FOREIGN PATENTS

| Number | Country | Date |
|---|---|---|
| 125,692 | Australia | Sept. 29, 1947 |